United States Patent
Kwon

(10) Patent No.: US 9,965,039 B2
(45) Date of Patent: May 8, 2018

(54) DEVICE AND METHOD FOR DISPLAYING USER INTERFACE OF VIRTUAL INPUT DEVICE BASED ON MOTION RECOGNITION

(71) Applicant: SAMSUNG ELECTRONICS CO., LTD., Suwon-si (KR)

(72) Inventor: Oh-yun Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 14/317,993

(22) Filed: Jun. 27, 2014

(65) Prior Publication Data

US 2015/0177843 A1     Jun. 25, 2015

(30) Foreign Application Priority Data

Dec. 23, 2013 (KR) ................. 10-2013-0160998

(51) Int. Cl.
| | | |
|---|---|---|
| G06F 3/033 | (2013.01) | |
| G06F 3/01 | (2006.01) | |
| H04N 5/44 | (2011.01) | |
| G06F 3/0354 | (2013.01) | |
| G06K 9/00 | (2006.01) | |

(52) U.S. Cl.
CPC .............. *G06F 3/017* (2013.01); *G06F 3/012* (2013.01); *G06F 3/03547* (2013.01); *H04N 5/4403* (2013.01); *G06K 9/00355* (2013.01); *G06K 9/00604* (2013.01); *H04N 2005/4428* (2013.01)

(58) Field of Classification Search
CPC .... G06F 3/017; G06F 3/0304; G06F 3/04883; G06F 3/04815; G06F 19/3418; G06F 3/005; G06F 19/30; G06F 19/3406; G06F 21/10; G06F 2221/074; G06F 3/04847; G06F 3/0485; G06F 3/0425; G06F 21/32
See application file for complete search history.

(56) References Cited

U.S. PATENT DOCUMENTS 7,921,370 B1 *  4/2011 Legault ................ G06F 9/4446
                                                    715/711
RE43,447 E *  6/2012 Lee ........................ G06F 3/017
                                                    348/77
(Continued)

FOREIGN PATENT DOCUMENTS

JP     2004-349915 A     12/2004
JP     2004-356819 A     12/2004
(Continued)

OTHER PUBLICATIONS

Communication dated Feb. 11, 2015 issued by the International Searching Authority in counterpart International Application No. PCT/KR2014/011206.

*Primary Examiner* — Di Xiao
(74) *Attorney, Agent, or Firm* — Sughrue Mion, PLLC

(57) ABSTRACT

A display device includes a user interface (UI) generator configured to generate a UI of the virtual input device; a camera configured to photograph a user's gesture; and a controller configured to compare the photographed user's gesture with a user's gesture stored in the template and to control the UI generator to display a UI of a virtual input device corresponding to the matched user's gesture.

18 Claims, 5 Drawing Sheets

(56) References Cited

U.S. PATENT DOCUMENTS

| | | | |
|---|---|---|---|
| 8,947,351 B1* | 2/2015 | Noble | G06F 3/04883 345/156 |
| 2009/0217211 A1 | 8/2009 | Hildreth et al. | |
| 2009/0228841 A1 | 9/2009 | Hildreth | |
| 2010/0329509 A1 | 12/2010 | Fahn et al. | |
| 2011/0199202 A1* | 8/2011 | De Mers | A61B 5/18 340/439 |
| 2012/0306740 A1* | 12/2012 | Hoda | G06F 3/0304 345/156 |
| 2013/0141327 A1 | 6/2013 | Wei et al. | |
| 2013/0275924 A1* | 10/2013 | Weinberg | G06F 3/017 715/863 |
| 2013/0283208 A1 | 10/2013 | Bychkov et al. | |
| 2013/0300662 A1* | 11/2013 | Liu | G06F 3/017 345/158 |
| 2013/0328769 A1* | 12/2013 | Jung | G06F 3/017 345/156 |
| 2014/0115507 A1* | 4/2014 | Bailey | G01C 21/3602 715/764 |
| 2014/0313130 A1* | 10/2014 | Yamano | G06F 3/0488 345/157 |

FOREIGN PATENT DOCUMENTS

| | | | |
|---|---|---|---|
| JP | 2011-517357 A | 6/2011 | |
| KR | 10-2007-0090645 A | 9/2007 | |
| KR | 10-1134245 B1 | 4/2012 | |
| KR | 10-2012-0096849 A | 8/2012 | |

\* cited by examiner

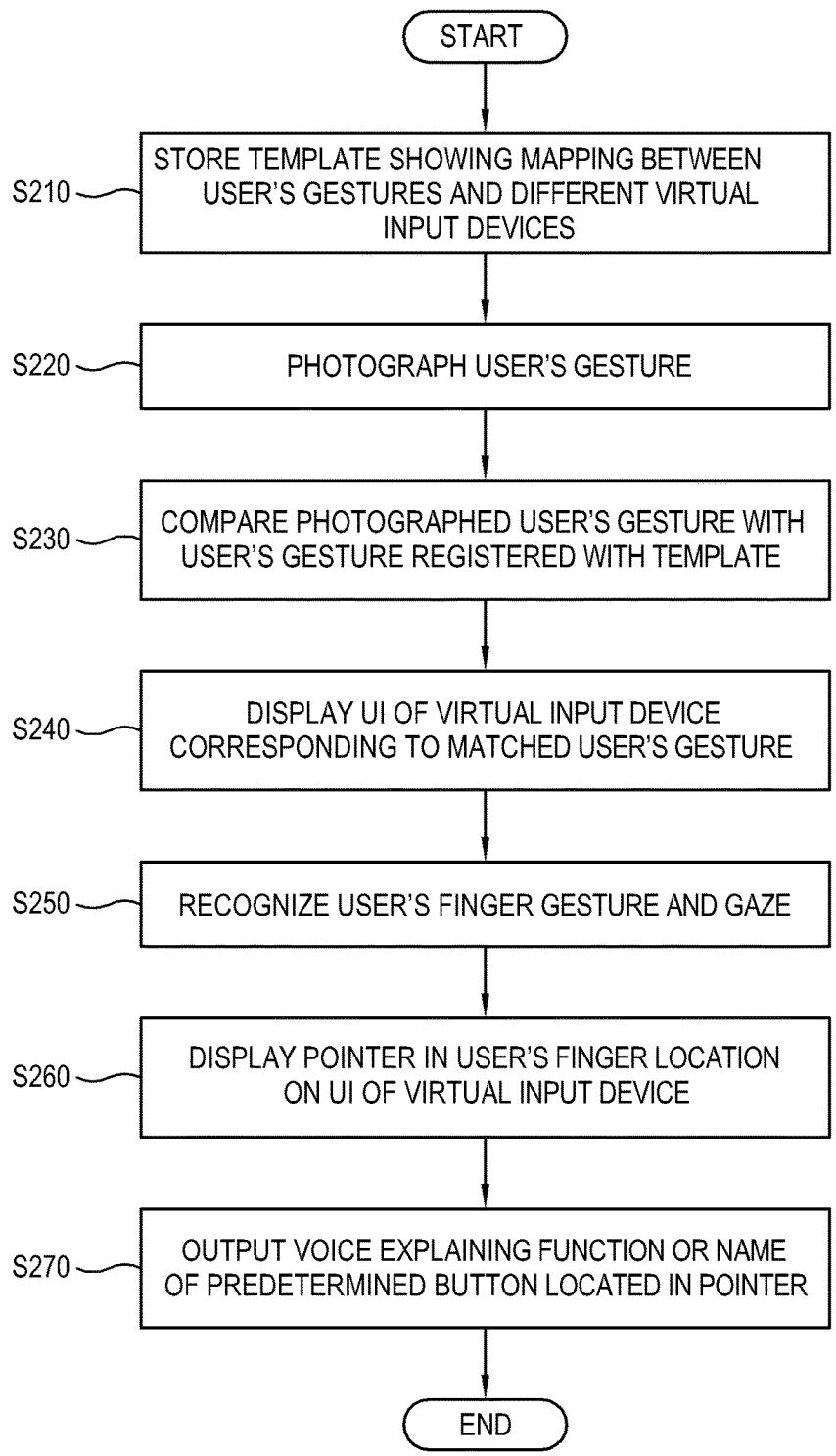

DEVICE AND METHOD FOR DISPLAYING USER INTERFACE OF VIRTUAL INPUT DEVICE BASED ON MOTION RECOGNITION

CROSS-REFERENCE TO RELATED APPLICATION

This application claims priority from Korean Patent Application No. 10-2013-0160998 filed on Dec. 23, 2013 in the Korean Intellectual Property Office, the disclosure of which is incorporated herein by reference in its entirety.

BACKGROUND

1. Field

Apparatuses and methods consistent with exemplary embodiments relate to displaying a virtual input device based on motion recognition, and more particularly, to recognizing a user's gesture and displaying and manipulating a particular virtual input device according to a user's gesture.

2. Description of the Related Art

In recent years, a command input device that uses a gesture recognition to recognize a user's gesture and execute a predetermined command related to the recognized gesture has been developed.

In general, users prefer inputting a command through a convenient input method. However, the related art command input method using a gesture needs a complicated technology solution such as an additional application of a voice recognition technology to apply a gesture recognition technology, and may cause a difficult situation if the voice recognition technology is not applicable in the environment where a real input device, e.g., a remote controller is not available.

SUMMARY

One or more exemplary embodiments provide a method and a device for displaying a user interface (UI) of a virtual input device based on motion recognition configured to not only display a UI of various virtual input devices only through gesture recognition but also to input a user's command through a UI of virtual input devices displayed by recognizing a finger gesture.

One or more exemplary embodiments also provide a method and a device for displaying a UI of a virtual input device based on motion recognition configured to reset a location of a user's finger with respect to a displayed virtual input device and to consistently provide an input of a user's command even if the location of the user's finger has been changed due to a user turning his/her eyes away from a screen and then turning his/her eyes back to the screen.

One or more exemplary embodiments also provide a method and a device for displaying a UI of a virtual input device based on motion recognition configured to support voice guidance to ensure convenient input of a user's command even if a visually handicapped person or a user turns his/her eyes away from the device.

One or more exemplary embodiments also provide a method and a device for displaying a UI of a virtual input device based on motion recognition configured to generate a sound similarly to a manipulating sound that is generated from a manipulated real input device when a user gives an input through a UI of a displayed virtual input device.

In accordance with an aspect of an exemplary embodiment, there is provided a device for displaying a user interface (UI) of a virtual input device based on motion recognition, the device including: a display configured to display an image; a storage configured to store a template that links user's gestures with different virtual input devices; a user interface (UI) generator configured to generate a UI of the virtual input device; a camera configured to photograph a user's gesture; and a controller configured to compare the photographed user's gesture with a user's gesture stored in the template of the storage and to control the UI generator to display on the display a UI of a virtual input device corresponding to the matched user's gesture.

The virtual input device may include a remote controller, a touch remote controller, a keyboard and a mouse.

The user's gesture may include a grip gesture of a real input device.

The device for displaying a user interface (UI) of a virtual input device may further include a motion calculator configured to recognize a user's finger gesture and a user's facial direction or gaze to operate a UI of the displayed virtual input device.

The controller may display a pointer on a UI of the virtual input device based on a user's finger gesture that has been calculated by the motion calculator.

The motion calculator may identify a movement direction, a movement quantity and a location of the user's finger, and calculates a size of the pointer on the UI of the virtual input device with respect to an actual finger.

The storage may store at least one of a manipulating sound of a virtual input device according to a user's finger gesture, a voice explaining an execution of a function, and a voice explaining a name of a functional button of a virtual input device on which a user's finger is located.

The motion calculator may determine a user's gaze or non-gaze by comparing scatter and concentration of gaze recognition data within a predetermined time with a predefined threshold value.

The controller may reset a user's previous finger location if a user's gaze is determined to be a non-gaze state.

The controller may change to a voice guiding mode if a user's gaze is determined to be a non-gaze state.

The controller may delete, add and modify a functional button of the UI of the virtual input device according to a user's command.

In accordance with an aspect of an exemplary embodiment, there is provided a method for displaying a UI of a virtual input device based on motion recognition, the method including: storing a template showing a link between user's gestures and different virtual input devices; photographing a user's gesture; comparing the photographed user's gesture with a user's gesture registered with the template in a storage; and displaying a UI of the virtual input device corresponding to the matched user's gesture according to the comparison result.

The recognizing may include identifying a movement direction, a movement quantity and a location of the user's finger and calculating a size of the pointer in the UI of the virtual input device with respect to an actual finger.

The recognizing the user's facial direction or gaze may include determining a user's gaze or non-gaze by comparing scatter and concentration of gaze recognition data within a predetermined time with a predefined threshold value.

BRIEF DESCRIPTION OF THE DRAWINGS

The above and/or other aspects will become more apparent by describing certain exemplary embodiments, with reference to the accompanying drawings, in which:

FIG. 5 is a flowchart showing a method for displaying the UI of the virtual input device based on motion recognition according to an exemplary embodiment.

DETAILED DESCRIPTION OF EXEMPLARY EMBODIMENTS

Figure 1:
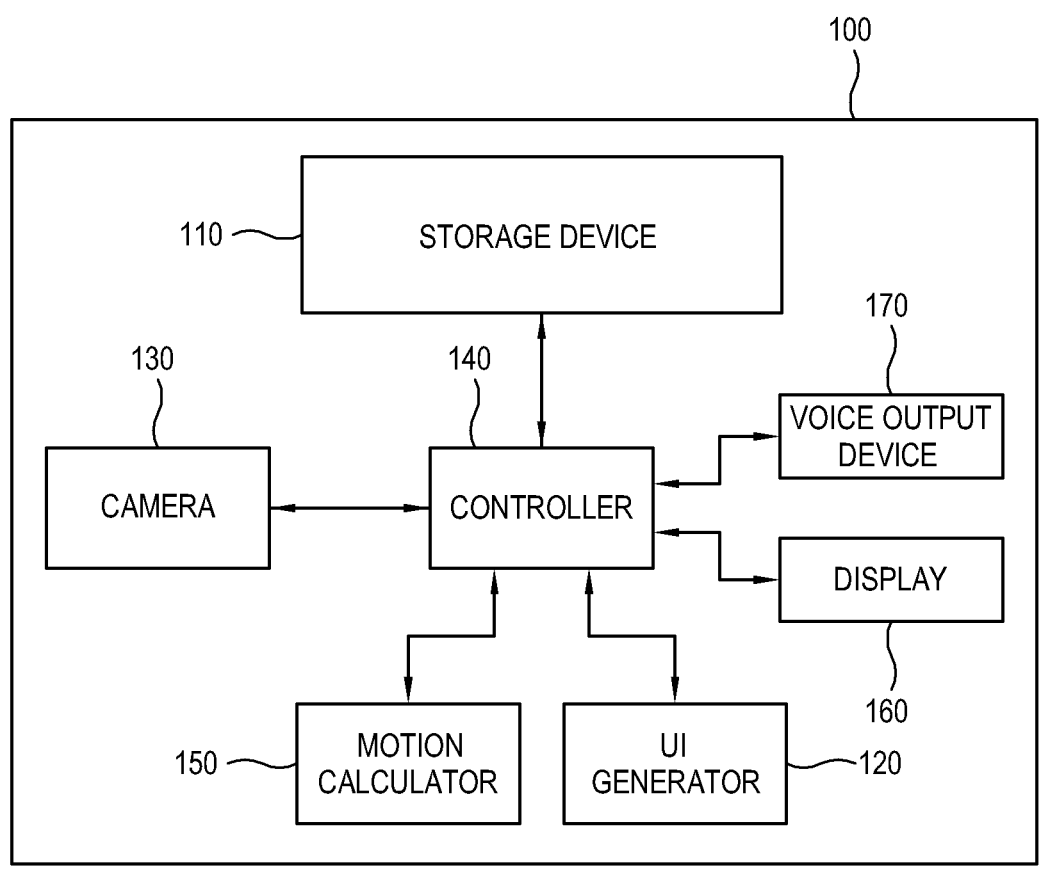
FIG. 1 is a block diagram of a device for displaying a user interface (UI) of a virtual input device based on motion recognition according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

A display device 100 for displaying a user interface (UI) of a virtual input device based on motion recognition according to an exemplary embodiment may include a television (TV), a personal computer (PC), a smart phone, a laptop computer, a personal digital assistant (PDA), a game console, etc., that is equipped with a camera.

As shown in FIG. 1, the display device 100 according to an exemplary embodiment may include a storage device 110, a UI generator 120, a camera 130, a controller 140, a display 160 and a voice output device 170. In addition to the foregoing elements, the display device 100 may further include other elements such as an image receiver (not shown) including a tuner, a wired/wireless communication portion (not shown), a timing controller (not shown), an image processor (not shown) and a voice processor (not shown).

The storage device 110 may store, in advance, a template database (DB) of a virtual input device that is related to a user's gesture, a user's personal information DB, a sound effect DB according to finger gestures, a voice DB explaining button names in a UI of a virtual input device, and a voice DB explaining an execution of a command that is input according to a finger gesture. Of course, the storage device 110 may store other various information including image data, graphic data and operating system (OS).

Figure 2:
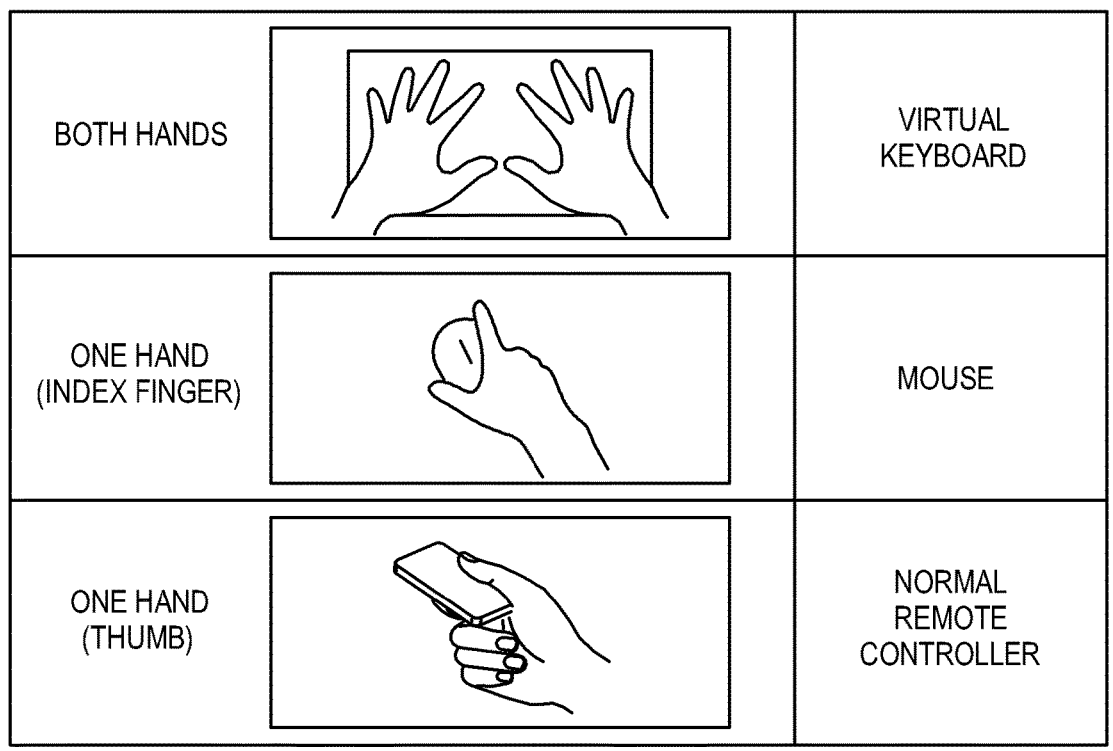
FIG. 2 illustrates a template that shows association between user's gestures and virtual input devices.

FIG. 2 illustrates an example of a template showing association between user's gestures and virtual input devices. In the template, a keyboard-typing gesture using both hands is related to a virtual keyboard; a mouse-gripping gesture using one hand is related to a virtual mouse; and a remote controller-gripping gesture using one hand is related to a remote controller.

The user's personal information DB is registered with and stores virtual input devices including buttons frequently used by each user. A user may delete unwanted buttons by drag-and-drop, or add and store other buttons by editing an initial basic UI of a virtual input device.

The sound effect DB according to finger gestures may store a typing sound for a virtual keyboard, a clicking sound for a virtual mouse and a button-touching sound for a virtual remote controller through a user setting or as a basic setting by recognizing finger gestures.

The voice DB explaining button names in a UI of a virtual input device may store a voice announcing the names of buttons in a UI of each virtual input device on which a user's finger is located. For example, if a user's finger is located in a 'record' button, a message "your finger is located on the record button" may be stored and thereafter announced.

The voice DB explaining an execution of a command that is input according to a finger gesture may store a voice explaining a user's command according to a finger gesture. For example, if a user drags and drops the 'record' button into a trash box to delete the button and make his/her own virtual input device, a message 'the record button has been put into the trash box to be deleted' may be defined and stored in advance.

The storage device 110 may include a storage medium including at least one of a flash memory, a hard disk, a multimedia card (MMC) micro, a memory card (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc and an optical disc.

The UI generator 120 may generate and display a UI of a virtual input device corresponding to a recognized user's gesture. The UI of the virtual input device refers to an image for receiving a user's input including various buttons such as a virtual keyboard, a virtual remote controller, a touch remote controller, a virtual mouse, etc. A user may click, double-click or touch the foregoing buttons to input a predetermined command.

Figure 3:
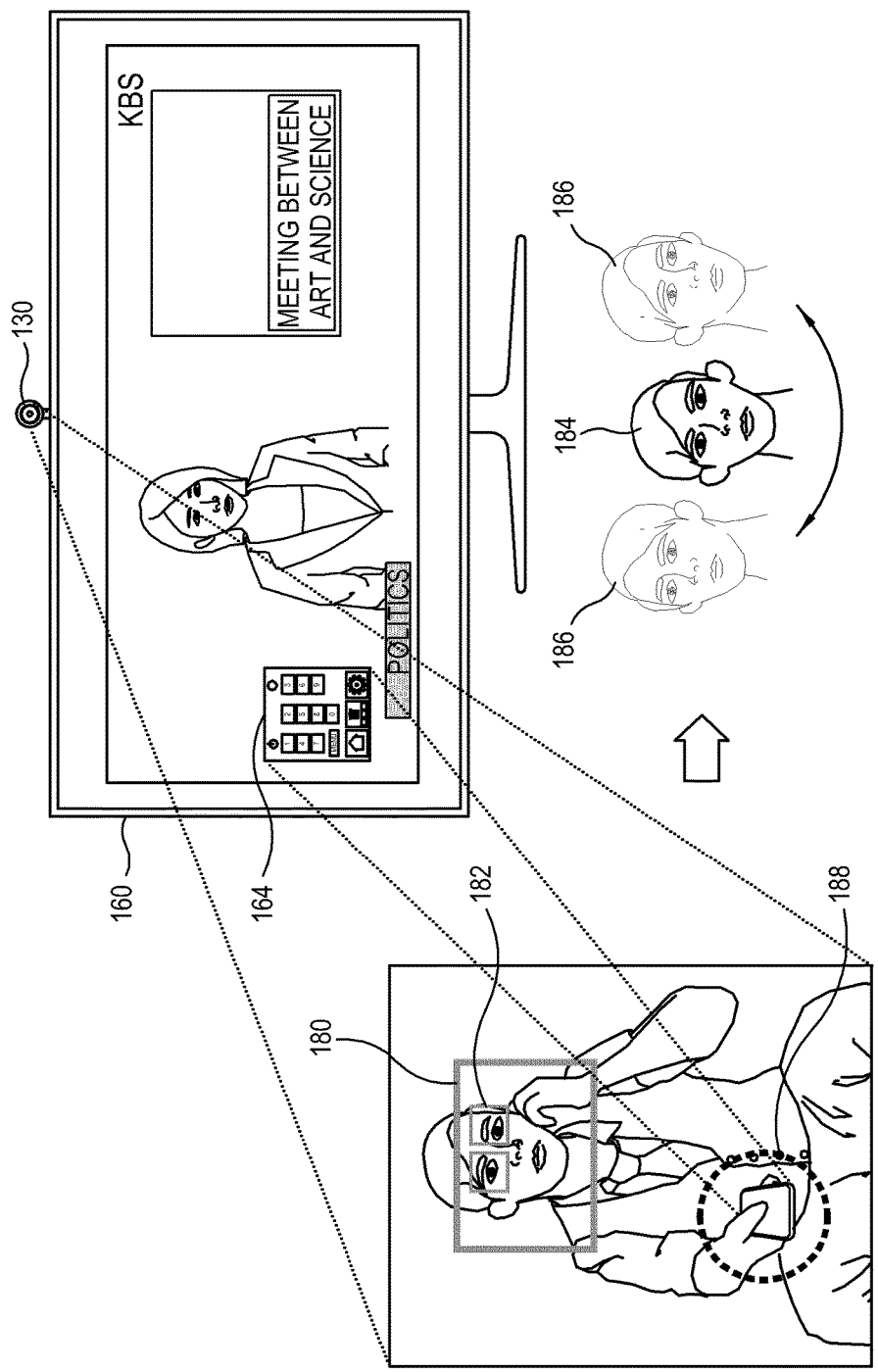
FIG. 3 illustrates using the device for displaying the UI of the virtual input device based on motion recognition according to an exemplary embodiment.

As shown in FIG. 3, the camera 130 may photograph a user's gesture, face 180, and/or eyes 182. An image 184 of the user's face and/or an image of the user's gesture (indicated by an area 188) may be generated. The camera 130 may include a webcam, a pan tilt camera, a digital camera, an analog camera and a camcorder. The camera 130 may be separately provided, or may be installed in the display device 100. The camera 130 may be installed only in a front surface of the display device 100, or may be installed at different surfaces or locations of the display device 100, to photograph a 2D or 3D image.

The controller 140 may control respective elements of the display device 100, e.g., the storage device 110, the UI generator 120, the camera 130, the display 160 and the voice output device 170.

The controller 140 may compare an image of a user's gesture photographed by the camera 130 with a gesture stored in the storage device 110, and control the UI generator 120 to generate and display a UI of a virtual input device corresponding to a matched gesture.

The controller 140 may include application specific integrated circuits (ASICs), digital signal processors (DSPs), digital signal processing devices (DSPDs), programmable logic devices (PLDs), field programmable gate arrays (FPGAs), micro-controllers and microprocessors.

The motion calculator 150 may calculate a user's facial direction, gaze direction, and finger gesture based on a user's image photographed by the camera 130. The motion calculator 150 may determine a user's gaze state (image 184) or a user's non-gaze state (image 186) by comparing scatter and concentration of gaze recognition data within a predetermined time and a predetermined threshold value. That is, in the user's gaze state, the user's gaze is toward the TV. In the user's non-gaze state, the user's gaze is not toward a direction of the TV.

The motion calculator 150 may receive a user's gesture (finger gesture) photographed by the camera 130, and calculate a finger location, a finger movement quantity, a finger movement direction, and a size of a UI of the virtual input device with respect to the actual finger. The controller 140 may execute various commands by using the finger location, the finger movement quantity, the finger movement direction, and the size of the UI of the virtual input device with respect to the actual finger that have been calculated by the motion calculator 150. The motion calculator 150 may include software, programs or hardware including software.

The display 160 may display an image processed by an image processor (not shown), and/or a UI of the virtual input device generated by the UI generator 120. The display 160 may display a single still image frame as a plurality of horizontal scanning lines is vertically arranged. The display 160 includes a display panel (not shown) to display the image. The display panel may include a liquid crystal panel including a liquid crystal layer, an organic light emitting panel including an organic light emitting layer or a plasma display panel. The display 160 may include a flexible panel.

The voice output device 170 may include a speaker, and may output a sound based on a voice signal processed by a voice processor (not shown). The voice processor may receive a voice signal from the storage device 110 corresponding to the finger gesture calculated by the motion calculator 150, and may process the voice signal into a signal that may be output by the voice output device 170. Based on the finger gesture calculated by the motion calculator 150, the voice output device 170 may output a manipulating sound of the virtual input device according to a user's finger gesture, a voice explaining an execution of a function and a voice explaining a name of a function button of the voice input device on which the user's finger is located.

A method for displaying a UI of a virtual input device based on motion recognition according to an exemplary embodiment will be described with reference to a (TV as an example.

As shown in FIG. 3, if a TV user makes a gesture of gripping a remote controller while watching TV, a camera 130 photographs the gesture of the TV user (area 188). The photographed gesture of gripping the remote controller is compared with a predefined gesture in a template for respective gestures which is created in advance and stored in the storage device 110, and a UI 164 of a virtual input device is displayed as an input device for a matched gesture on the display 160. Mapping a virtual UI for input devices for respective gestures is based on general characteristics of user's gestures when a user uses a remote controller, a keyboard, and/or a mouse. For example, as shown in FIG. 2, a gesture of stretching both hands like typing on a keyboard is mapped with a keyboard, a gesture of covering a mouse with one hand and bending an index finger is mapped with a mouse, and a gesture of holding a remote controller with one hand and lifting a thumb is mapped with a remote controller.

If a user makes a gesture of gripping a remote controller, different virtual remote controllers including normal and touch virtual remote controllers may be displayed for a user to select a preferred remote controller. Thereafter, if a user makes a gesture of moving a thumb, a normal remote controller may be displayed, and if a user makes a gesture of an index finger that is mainly used to use a touch remote controller, the touch remote controller may be displayed. The step of displaying the UI of the virtual remote controller may be reduced through direct recognition of a finger gesture without a grip gesture step.

A user may additionally register his/her finger shape of gripping a real remote controller with the storage device 110 to increase the recognition rate of a user's grip gesture. In particular, a virtual remote controller may be displayed in a half tone, and if no additional information is obtained with respect to a user's gesture or finger gesture over time after the grip and finger gesture is recognized and displayed, the degree of transparency of the virtual remote controller becomes higher, and after a predetermined time the virtual remote controller may disappear from a screen.

Figure 4:
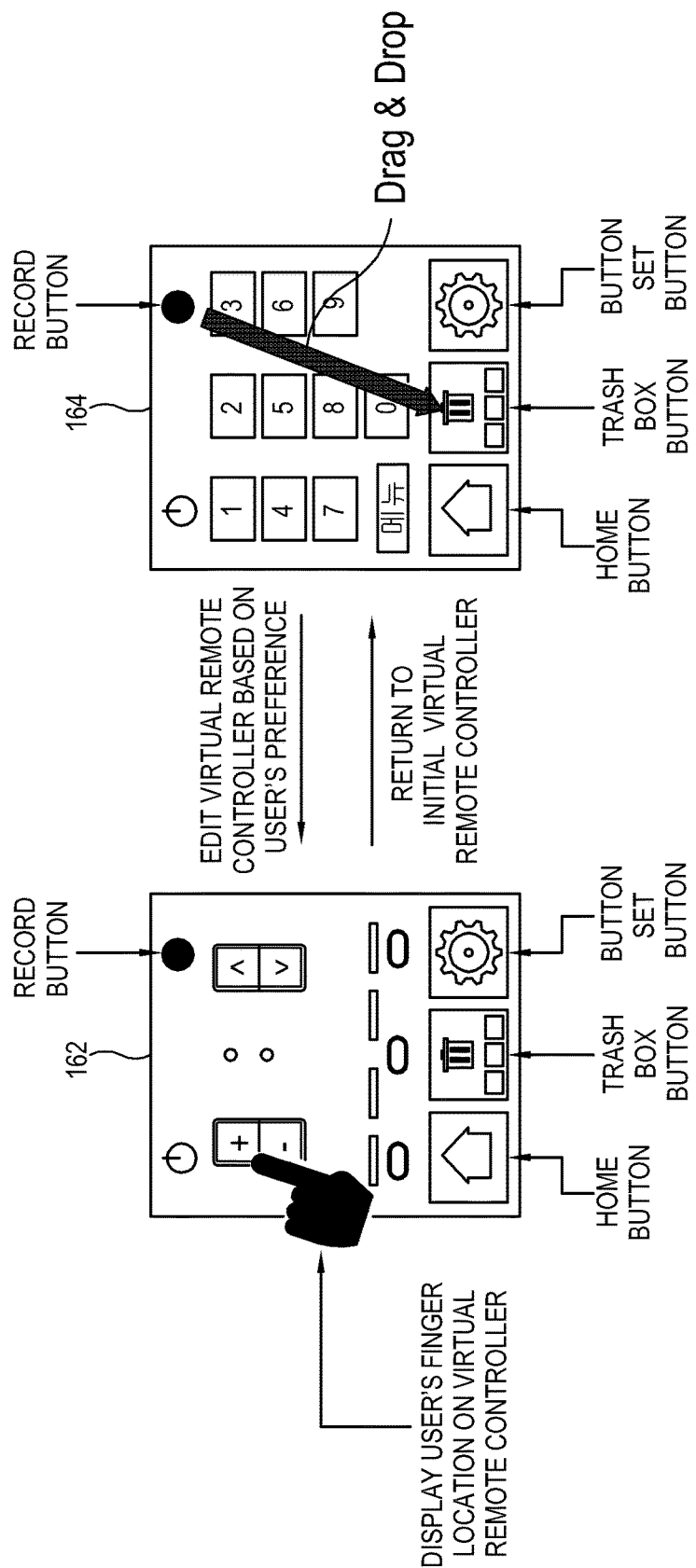
FIG. 4 illustrates edition of a UI of a virtual input device according to an exemplary embodiment.

As shown in FIG. 4, after a virtual remote controller is displayed in a screen, a user's finger gesture may be detected and the detected finger location may be displayed on a UI of the virtual remote controller. If the detected finger location is displayed, a user may be supported to adjust his/her finger gesture quantity to press a button of the virtual remote controller by looking at the virtual remote controller in a TV screen.

After the virtual remote controller is displayed in a TV screen, if a user makes a gesture of touching or pressing a button of the virtual remote controller, a corresponding sound may be generated so that a user may feel like his/her gesture manipulates the button of the virtual remote controller. As necessary, a user may edit a desired sound, or a sound may be set as default.

In a circumstance where a user of the virtual remote controller has been recognized by the camera 130 to not directly look at the TV screen according to a recognition result of a user's facial direction or gaze (non-gaze state 186), if a user makes a finger gesture of manipulating the virtual remote controller after displaying the virtual remote controller in the TV screen, an automatic guiding function for outputting a voice explaining a name of the button on which the user's finger is located may be enabled for a user to conveniently use the virtual remote controller without a need to directly looking at the virtual remote controller. That is, the finger gesture, the facial direction and the gaze or non-gaze of the TV may be simultaneously detected and analyzed.

However, the finger gesture may be determined by using consecutive frame data, and the facial direction and the gaze or non-gaze toward the TV screen may be determined based on optional consecutive or non-consecutive frame data. This is because a user's gaze is not necessarily directed to the TV screen even if a facial direction is directed to the TV in case the user is a visually handicapped person. The user's gaze state or the user's non-gaze state with respect to the TV screen may be determined based on data obtained by an infrared camera.

If a user temporarily moves, a finger location and gesture on the virtual remote controller displayed in the TV screen may be changed. Even if a user makes a gesture of manipulating the virtual remote controller again while the virtual remote controller is displayed, the gesture may be recognized as a different location from the initial finger location and thus malfunction may occur. Accordingly, if it is recognized by the camera that a user of the virtual remote controller does not directly look at the TV screen based on the recognition result for a user's facial direction or gaze, the initially displayed finger location may be reset, and the finger location that is recognized after a user looks at front again may be set.

FIG. 4 illustrates an example of editing an initial virtual remote controller 160 into a desired virtual remote controller 164. If a user intends to register a particular functional button of the virtual remote controller, e.g., register a voice conversational microphone button with his/her own simple gesture, he/she may double-click the concerned button in the virtual remote controller displayed in a screen, and then the screen is moved to a registration screen for a gesture that may replace the button, and a user may register or delete his/her own simple gestures. A simple gesture that is registered for each user may be used after a user checks the registered list through a bookmark gesture and selects the gesture through the virtual remote controller. Except for frequently used buttons of the virtual remote controller, other buttons may be dragged and dropped into a trash box by using a trash box function of the virtual remote controller, or may be taken out back and displayed whenever necessary. Consequently, a virtual remote controller that is formed by user's registration and thus includes only buttons needed by a user provides a highly intuitive interface and is easy to use. In particular, a user may enlarge, reduce or otherwise set the number, location and size of buttons of the virtual remote controller to his/her taste and for his/her sight.

A 'Home' button may be provided in a virtual remote controller so that buttons may be displayed as set at the time when a TV is released on the market. Detailed functions of a TV on screen demand (OSD) menu may be designated as a keyboard shortcut in a button of the virtual remote controller so that the detailed functions may be executed through a double-clicking gesture.

The method for displaying the UI of the virtual input device based on motion recognition according to an exemplary embodiment will be described in detail with reference to FIG. 5.

The template showing connection (mapping) between user's gestures and different virtual input devices is stored in advance in the storage device 110 (operation S210). Of course, the storage device 110 may store in advance the voice data explaining names or functions of buttons of the UI of the virtual input devices, voice data explaining functions executed through gestures, and manipulating sound for buttons of the UI of the virtual input devices as well as the template of the virtual input devices for respective user's gestures.

The user's gesture, facial direction and gaze are photographed by the camera 130 (operation S220).

The user's gesture that has been photographed by the camera 130 is compared with the user's gesture registered with the template in the storage device 110 (operation S230).

The UI of the virtual input device that matches the user's gesture according to the comparison result is displayed (operation S240).

The user's finger gesture and gaze are recognized (operation S250).

The user's finger location is illustrated as, e.g., a finger-shaped pointer on the UI of the displayed virtual input device (operation S260). A user may move his/her finger and click or touch a desired button through the UI of the virtual remote controller through his/her gesture to input his/her command.

If a user turns his/her eyes away from the TV screen, the display device is automatically changed to a voice mode to explain a function or a name of a particular button located in the pointer and outputs a predetermined voice (operation S270). Of course, regardless of the user's gaze, the display device may be set in advance to provide voice explanation always.

As described above, a user may display a UI of various virtual input devices through his/her gesture only.

A user may register and use his/her own UI of the virtual input device for convenience.

Even if a visually handicapped person or a user's gaze is not directed to the front, the voice guidance is provided and a user may use the UI of the virtual input device more conveniently.

Even if there is a change in an environment while a user uses the UI of the displayed virtual input device, consistency of inputting commands for the UI of the virtual input device may be maintained.

Further, even if a user uses a UI of a virtual input device displayed on a display through his/her gesture, the same sound may be provided as if using a real input device.

Further, a UI of a virtual input device based on software is applicable, and thus updating new functions may be easily performed.

The described-above exemplary embodiments and advantages are merely exemplary and are not to be construed as limiting. The present teaching can be readily applied to other types of apparatuses. The description of exemplary embodiments is intended to be illustrative, and not to limit the scope of the claims, and many alternatives, modifications, and variations will be apparent to those skilled in the art.

What is claimed is:

1. A display device comprising:
a camera configured to obtain captured images regarding a user's hand gesture; and
a processor configured to:
in response to a first captured image of the user's hand gesture being obtained, determine a user interface (UI) from among a plurality of UIs respectively corresponding to a type of a virtual input device based on the first captured image of the user's hand gesture, and display the determined UI corresponding to the type of the virtual input device, and
in response to a second captured image of the user's hand gesture being obtained, determine a user command using the UI based on the second captured image,
wherein the processor is further configured to:
recognize a user's finger gesture and a user's gaze to operate the UI,
detect a location of a user's finger on the UI based on the recognized user's finger gesture, and
reset the detected location of the user's finger if the user's gaze is determined to be a non-gaze state,
wherein the captured images include the first captured image and the second captured image,
the UI comprises an image of one among an image of a remote controller, an image of a touch remote controller, an image of a keyboard, and an image of a mouse, and
the user's hand gesture comprises a gesture of operating the virtual input device.

2. The display device of claim 1, wherein the user's hand gesture comprises a grip gesture of a real input device.

3. The display device of claim 1, wherein the processor is further configured to recognize a user's facial direction to operate the UI of the virtual input device.

4. The display device of claim 1, wherein the processor is further configured to control displaying a pointer on the UI of the virtual input device based on the user's finger gesture.

5. The display device of claim 1, wherein the processor identifies at least one among a movement direction, a movement quantity, and the location of the user's finger, and calculates a size of a pointer on the UI of the virtual input device with respect to an actual finger.

6. The display device of claim 1, further comprising:
a storage configured to store at least one among a manipulating sound of the virtual input device according to the user's finger gesture, a voice announcing an execution of a function, and a voice announcing a name of a functional button of the virtual input device on which the user's finger is located.

7. The display device of claim 1, wherein the processor determines the user's gaze as a gaze state or the non-gaze state, with respect to a display, by comparing scatter and concentration of gaze recognition data within a time period with a threshold value.

8. The display device of claim 1, wherein the processor changes to a voice guiding mode if the user's gaze is determined to be the non-gaze state.

9. The display device of claim 1, wherein the processor deletes, adds, and modifies a functional button of the UI of the virtual input device according to the user command.

10. A method for displaying a user interface (UI) of a virtual input device, the method comprising:
in response to a first captured image of a user's hand gesture being obtained, determining the UI from among a plurality of UIs respectively corresponding to a type of the virtual input device based on the first captured image of the user's hand gesture, and displaying the determined UI corresponding to the type of the virtual input device, and
in response to a second captured image of the user's hand gesture being obtained, determining a user command using the UI based on the second captured image,
recognizing a user's finger gesture and a user's gaze to operate the UI,
detecting a location of a user's finger on the UI based on the recognized user's finger gesture, and
resetting the detected location of the user's finger if the user's gaze is determined to be a non-gaze state, wherein the UI comprises an image of one among an image of a remote controller, an image of a touch remote controller, an image of a keyboard, and an image of a mouse, and
the user's hand gesture comprises a gesture of operating the virtual input device.

11. The method of claim 10, wherein the user's hand gesture comprises a grip gesture with respect to a real input device.

12. The method of claim 10, further comprising recognizing a user's facial direction to operate the UI of the virtual input device.

13. The method of claim 10, further comprising displaying a pointer on the UI of the virtual input device based on the recognized user's finger gesture.

14. The method of claim 10, wherein the recognizing comprises identifying at least one among a movement direction, a movement quantity, and the location of the user's finger and calculating a size of a pointer in the UI of the virtual input device with respect to an actual finger.

15. The method of claim 10, further comprising:
storing at least one among a manipulating sound of the virtual input device according to the user's finger gesture, a voice announcing an execution of a function, and a voice announcing a name of a functional button of the virtual input device on which the user's finger is located.

16. The method of claim 10, wherein the recognizing the user's gaze comprises determining a gaze state or the non-gaze state, with respect to a display, by comparing scatter and concentration of gaze recognition data within a time period with a threshold value.

17. The method of claim 10, further comprising automatically changing to a voice guiding mode if the user's gaze is determined to be the non-gaze state.

18. The method of claim 10, further comprising at least one among deleting, adding, and modifying a functional button in the UI of the virtual input device according to the user command.

* * * * *